US012307994B1

(12) United States Patent
Huang et al.

(10) Patent No.: US 12,307,994 B1
(45) Date of Patent: May 20, 2025

(54) DATA COMPENSATION METHOD AND DISPLAY CONTROL CIRCUIT FOR DISPLAY PANEL

(71) Applicant: NOVATEK Microelectronics Corp., Hsinchu (TW)

(72) Inventors: Hsien-Po Huang, Hsinchu (TW); Yen-Tao Liao, Hsinchu (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 18/650,027

(22) Filed: Apr. 29, 2024

(51) Int. Cl.
*G09G 3/36* (2006.01)

(52) U.S. Cl.
CPC .................................. *G09G 3/3607* (2013.01)

(58) Field of Classification Search
CPC .... G09G 2340/16; G09G 3/32; G09G 3/3233; G09G 2300/0819
See application file for complete search history.

(56) References Cited

U.S. PATENT DOCUMENTS

2018/0240399 A1* 8/2018 Lin .......................... G09G 3/32
2021/0272508 A1* 9/2021 Fujii .................... G09G 3/3275
2021/0312850 A1* 10/2021 Kim ..................... G09G 3/2003
2022/0366853 A1 11/2022 Kwon
2023/0215378 A1* 7/2023 Choi ...................... G11C 19/28 345/204
2024/0323334 A1* 9/2024 Yim ..................... H04N 13/128

FOREIGN PATENT DOCUMENTS

CN 115376471 A 11/2022
TW 201911273 A 3/2019

* cited by examiner

*Primary Examiner* — Van N Chow
(74) *Attorney, Agent, or Firm* — CKC & Partners Co., LLC

(57) ABSTRACT

A data compensation method include following steps. Input subpixel data corresponding to subpixels of a first horizontal line of a display panel are converted respectively into digital values. A first accumulated value is generated by accumulating the digital values converted from the input subpixel data corresponding to the first horizontal line. A difference value is calculated between the first accumulated value corresponding to the first horizontal line and a second accumulated value corresponding to a second horizontal line. A first compensation value with respect to a first subpixel of the first horizontal line is obtained according to a first input subpixel data, the difference value and a first voltage polarity for driving the first subpixel. A first output subpixel data to be displayed by the first subpixel is generated according to the first input subpixel data and the first compensation value.

13 Claims, 12 Drawing Sheets

$LT2_{POL+}$ difference value

| input subpixel data | -512 | -448 | -384 | -320 | -256 | -192 | -128 | -64 | 0 | 64 | 128 | 192 | 256 | 320 | 384 | 448 | 512 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 16 | 48 | 42 | 36 | 30 | 24 | 18 | 12 | 6 | 0 | -6 | -12 | -18 | -24 | -30 | -36 | -42 | -48 |
| 32 | 104 | 91 | 78 | 65 | 52 | 39 | 26 | 13 | 0 | -22 | -44 | -66 | -88 | -110 | -132 | -154 | -176 |
| 48 | 152 | 133 | 114 | 95 | 76 | 57 | 38 | 19 | 0 | -44 | -88 | -132 | -176 | -220 | -255 | -255 | -255 |
| 64 | 192 | 168 | 144 | 120 | 96 | 72 | 48 | 24 | 0 | -47 | -94 | -141 | -188 | -235 | -255 | -255 | -255 |
| 80 | 224 | 196 | 168 | 140 | 112 | 84 | 56 | 28 | 0 | -46 | -92 | -138 | -184 | -230 | -255 | -255 | -255 |
| 96 | 248 | 217 | 186 | 155 | 124 | 93 | 62 | 31 | 0 | -42 | -84 | -126 | -168 | -210 | -252 | -255 | -255 |
| 112 | 255 | 238 | 204 | 170 | 136 | 102 | 68 | 34 | 0 | -38 | | -114 | -152 | -190 | -228 | -255 | -255 |
| 128 | 255 | 255 | 222 | 185 | 148 | 111 | 74 | 37 | 0 | -34 | SEL1 | -102 | -136 | -170 | -204 | -238 | -255 |
| 144 | 255 | 255 | 240 | 200 | 160 | 120 | 80 | 40 | 0 | -32 | -64 | -96 | -128 | -160 | -192 | -224 | -255 |
| 160 | 255 | 255 | 255 | 215 | 172 | 129 | 86 | 43 | 0 | -28 | -56 | -84 | -112 | -140 | -168 | -196 | -224 |
| 176 | 255 | 255 | 255 | 230 | 184 | 138 | 92 | 46 | 0 | -25 | -50 | -75 | -100 | -125 | -150 | -175 | -200 |
| 192 | 255 | 255 | 255 | 245 | 196 | 147 | 98 | 49 | 0 | -22 | -44 | -66 | -88 | -110 | -132 | -154 | -176 |
| 208 | 255 | 255 | 255 | 255 | 216 | 162 | 108 | 54 | 0 | -18 | -36 | -54 | -72 | -90 | -108 | -126 | -144 |
| 224 | 255 | 255 | 255 | 255 | 224 | 168 | 112 | 56 | 0 | -12 | -24 | -36 | -48 | -60 | -72 | -84 | -96 |
| 240 | 255 | 255 | 255 | 230 | 184 | 138 | 92 | 46 | 0 | -6 | -12 | -18 | -24 | -30 | -36 | -42 | -48 |
| 256 | 0 | 0 | 0 | 0 | 0 | 0 | 0 | 0 | 0 | 0 | 0 | 0 | 0 | 0 | 0 | 0 | 0 |

FIG. 5

$LT2_{POL-}$ difference value

| input subpixel data | -512 | -448 | -384 | -320 | -256 | -192 | -128 | -64 | 0 | 64 | 128 | 192 | 256 | 320 | 384 | 448 | 512 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 16 | -48 | -42 | -36 | -30 | -24 | -16 | -12 | -6 | 0 | 6 | 12 | 18 | 24 | 30 | 36 | 42 | 48 |
| 32 | -176 | -154 | -132 | -110 | -88 | -66 | -44 | -22 | 0 | 13 | 26 | 39 | 52 | 65 | 78 | 91 | 104 |
| 48 | -255 | -255 | -255 | -220 | -176 | -132 | -88 | -44 | 0 | 19 | 38 | 57 | 76 | 95 | 114 | 133 | 152 |
| 64 | -255 | -255 | -255 | -235 | -188 | -141 | -94 | -47 | 0 | 24 | 48 | 72 | 96 | 120 | 144 | 168 | 192 |
| 80 | -255 | -255 | -255 | -230 | -184 | -138 | -92 | -46 | 0 | 28 | 56 | 84 | 112 | 140 | 168 | 196 | 224 |
| 96 | -255 | -255 | -252 | -210 | -168 | -126 | -84 | -42 | 0 | 31 | 62 | 93 | 124 | 155 | 186 | 217 | 248 |
| 112 | -255 | -255 | -228 | -190 | -152 | -114 | -76 | -38 | 0 | 34 | 68 | 102 | 136 | 170 | 204 | 238 | 255 |
| 128 | -255 | -238 | -204 | -170 | -136 | -102 | -68 | -34 | 0 | 37 | 74 | 111 | 148 | 185 | 222 | 255 | 255 |
| 144 | -255 | -224 | -192 | -160 | -128 | -96 | -64 | -32 | 0 | 40 | 80 | 120 | 160 | 200 | 240 | 255 | 255 |
| 160 | -224 | -196 | -166 | -140 | -112 | -84 | -56 | -28 | 0 | 43 | 86 | 129 | 172 | 215 | 255 | 255 | 255 |
| 176 | -200 | -175 | -150 | -125 | -100 | -75 | -50 | -25 | 0 | 46 | 92 | 138 | 184 | 230 | 255 | 255 | 255 |
| 192 | -176 | -154 | -132 | -110 | -88 | -66 | -44 | -22 | 0 | 49 | 98 | 147 | 196 | 245 | 255 | 255 | 255 |
| 208 | -144 | -126 | -106 | -90 | -72 | -54 | -36 | -18 | 0 | 54 | 108 | 162 | 216 | 255 | 255 | 255 | 255 |
| 224 | -96 | -84 | -72 | -60 | -48 | -36 | -24 | -12 | 0 | 56 | 112 | 168 | 224 | 255 | 255 | 255 | 255 |
| 240 | -48 | -42 | -36 | -30 | -24 | -18 | -12 | -6 | 0 | 46 | 92 | 138 | 184 | 230 | 255 | 255 | 255 |
| 256 | 0 | 0 | 0 | 0 | 0 | 0 | 0 | 0 | 0 | 0 | 0 | 0 | 0 | 0 | 0 | 0 | 0 |

FIG. 6

LT3$_{POL+}$ accumulated value

| input subpixel data | -512 | -448 | -384 | -320 | -256 | -192 | -128 | -64 | 0 | 64 | 128 | 192 | 256 | 320 | 384 | 448 | 512 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 16 | 40 | 35 | 30 | 25 | 20 | 15 | 10 | 5 | 0 | -6 | -12 | -18 | -24 | -30 | -36 | -42 | -48 |
| 32 | 40 | 35 | 30 | 25 | 20 | 15 | 10 | 5 | 0 | -6 | -12 | -18 | -24 | -30 | -36 | -42 | -48 |
| 48 | 40 | 35 | 30 | 25 | 20 | 15 | 10 | 5 | 0 | -7 | -14 | -21 | -28 | -35 | -42 | -49 | -56 |
| 64 | 48 | 42 | 36 | 30 | 24 | 18 | 12 | 6 | 0 | -6 | -12 | -18 | -24 | -30 | -36 | -42 | -48 |
| 80 | 56 | 49 | 42 | 35 | 28 | 21 | 14 | 7 | 0 | -8 | -16 | -24 | -32 | -40 | -48 | -56 | -64 |
| 96 | 56 | 49 | 42 | 35 | 28 | 21 | 14 | 7 | 0 | -8 | -16 | -24 | -32 | -40 | -48 | -56 | -64 |
| 112 | 64 | 56 | 48 | 40 | 32 | 24 | 16 | 8 | 0 | -8 | -16 | | -32 | -40 | -48 | -56 | -64 |
| 128 | 64 | 56 | 48 | 40 | 32 | 24 | 16 | 8 | 0 | -8 | -16 | | -32 | -40 | -48 | -56 | -64 |
| 144 | 64 | 56 | 48 | 40 | 32 | 24 | 16 | 8 | 0 | -8 | -16 | -24 | -32 | -40 | -48 | -56 | -64 |
| 160 | 64 | 56 | 48 | 40 | 32 | 24 | 16 | 8 | 0 | -7 | -14 | -21 | -28 | -35 | -42 | -49 | -56 |
| 176 | 64 | 56 | 48 | 40 | 32 | 24 | 16 | 8 | 0 | -7 | -14 | -21 | -28 | -35 | -42 | -49 | -56 |
| 192 | 64 | 56 | 48 | 40 | 32 | 24 | 16 | 8 | 0 | -7 | -14 | -21 | -28 | -35 | -42 | -49 | -56 |
| 208 | 72 | 63 | 54 | 45 | 36 | 27 | 18 | 9 | 0 | -7 | -14 | -21 | -28 | -35 | -42 | -49 | -56 |
| 224 | 72 | 63 | 54 | 45 | 36 | 27 | 18 | 9 | 0 | -6 | -12 | -18 | -24 | -30 | -36 | -42 | -48 |
| 240 | 32 | 28 | 24 | 20 | 16 | 12 | 8 | 4 | 0 | -2 | -4 | -6 | -8 | -10 | -12 | -14 | -16 |
| 256 | 0 | 0 | 0 | 0 | 0 | 0 | 0 | 0 | 0 | 0 | 0 | 0 | 0 | 0 | 0 | 0 | 0 |

SEL2

FIG. 9

LT3$_{POL-}$ accumulated value

| input subpixel data | -512 | -448 | -384 | -320 | -256 | -192 | -128 | -64 | 0 | 64 | 128 | 192 | 256 | 320 | 384 | 448 | 512 |
|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 |
| 16 | -48 | -42 | -36 | -30 | -24 | -18 | -12 | -6 | 0 | 5 | 10 | 15 | 20 | 25 | 30 | 35 | 40 |
| 32 | -48 | -42 | -36 | -30 | -24 | -18 | -12 | -6 | 0 | 5 | 10 | 15 | 20 | 25 | 30 | 35 | 40 |
| 48 | -56 | -49 | -42 | -35 | -28 | -21 | -14 | -7 | 0 | 5 | 10 | 15 | 20 | 25 | 30 | 35 | 40 |
| 64 | -48 | -42 | -36 | -30 | -24 | -18 | -12 | -6 | 0 | 6 | 12 | 18 | 24 | 30 | 36 | 42 | 48 |
| 80 | -64 | -56 | -48 | -40 | -32 | -24 | -16 | -8 | 0 | 7 | 14 | 21 | 28 | 35 | 42 | 49 | 56 |
| 96 | -64 | -56 | -48 | -40 | -32 | -24 | -16 | -8 | 0 | 7 | 14 | 21 | 28 | 35 | 42 | 49 | 56 |
| 112 | -64 | -56 | -48 | -40 | -32 | -24 | -16 | -8 | 0 | 8 | 16 | 24 | 32 | 40 | 48 | 56 | 64 |
| 128 | -64 | -56 | -48 | -40 | -32 | -24 | -16 | -8 | 0 | 8 | 16 | 24 | 32 | 40 | 48 | 56 | 64 |
| 144 | -64 | -56 | -48 | -40 | -32 | -24 | -16 | -8 | 0 | 8 | 16 | 24 | 32 | 40 | 48 | 56 | 64 |
| 160 | -56 | -49 | -42 | -35 | -28 | -21 | -14 | -7 | 0 | 8 | 16 | 24 | 32 | 40 | 48 | 56 | 64 |
| 176 | -56 | 49 | -42 | -35 | -28 | -21 | -14 | -7 | 0 | 8 | 16 | 24 | 32 | 40 | 48 | 56 | 64 |
| 192 | -56 | -49 | -42 | -35 | -28 | -21 | -14 | -7 | 0 | 8 | 16 | 24 | 32 | 40 | 48 | 56 | 64 |
| 208 | -56 | -49 | -42 | -35 | -28 | -21 | -14 | -7 | 0 | 9 | 18 | 27 | 36 | 45 | 54 | 63 | 72 |
| 224 | -48 | -42 | -36 | -30 | -24 | -18 | -12 | -6 | 0 | 9 | 18 | 27 | 36 | 45 | 54 | 63 | 72 |
| 240 | -16 | -14 | -12 | -10 | -8 | -6 | -4 | -2 | 0 | 4 | 8 | 12 | 16 | 20 | 24 | 28 | 32 |
| 256 | 0 | 0 | 0 | 0 | 0 | 0 | 0 | 0 | 0 | 0 | 0 | 0 | 0 | 0 | 0 | 0 | 0 |

FIG. 10

DATA COMPENSATION METHOD AND DISPLAY CONTROL CIRCUIT FOR DISPLAY PANEL

BACKGROUND

Field of Invention

The disclosure relates to a data compensation method. More particularly, the disclosure relates to a data compensation method and a display control circuit for adjusting data signals provided to the source driver in a display device.

Description of Related Art

A modern display device may include some components, such as a source driver, a gate driver and a timing controller for providing essential data or control signals for displaying. A source driver is a crucial component in a display panel, especially in active matrix displays like liquid crystal displays (LCDs) or and organic light emitting diode displays (OLEDs). A primary function of the source driver is to control and drive the individual pixel elements within the display. Key functions of the source driver in a display panel include pixel data distribution, polarity control, gray scale control, etc.

Overall, the source driver plays a vital role in translating digital image data into the appropriate electrical signals to control the individual pixels on the display, ensuring accurate and responsive rendering of images.

In a conventional LCD panel, there are coupling capacitance between data lines on a lower substrate of the LCD panel and a common electrode on an upper substrate of the LCD panel. When data voltages outputted from an output channel of the source driver changes in a relatively large degree, such as from a low voltage to a high data voltage, the voltage transition may influence the voltage of the common electrode of the LCD panel through the coupling capacitance. When a large number of output channels of the source driver changes in a similar behavior, i.e., data voltage changing significantly, in the same scan period, the voltage of the common electrode may be obviously shifted. Those pixels driven by remaining output channels which do not have such large data voltage difference may be not able to display the expected gray levels since the voltage of the common electrode is shifted and consequently, a part of a horizontal line may looks like brighter or darker than it is expected to display, which is called horizontal crosstalk.

Reference is further made to FIG. 1, which is a schematic diagram illustrating an example of a display frame FR1 displayed on an LCD panel according to the prior art. While displaying the display frame FR1, a top horizontal line of a bright region $R_{BR}$ displaying high brightness levels looks like including a bright line segment BL1, and a bottom horizontal line of the bright region $R_{BR}$ looks like including another bright line segment BL2. However, the line segments BL1 and BL2 are horizontal crosstalk and not the result of ideal data voltages, since the data voltages those should be displayed in the locations of the bright line segments BL1 and BL2 are influenced by the common voltage shift.

SUMMARY

An embodiment of the disclosure provides a data compensation method, which is suitable for a display control circuit. The data compensation method includes following steps. Input subpixel data corresponding to subpixels of a first horizontal line of a display panel are converted respectively into digital values. Each of the digital values is related to a driving voltage capable of driving a corresponding subpixel of the first horizontal line to display. Each of the input subpixel data is converted into one of the digital values according to a voltage polarity for driving the corresponding subpixel. A first accumulated value is generated by accumulating the digital values converted from the plurality of input subpixel data corresponding to the first horizontal line. A difference value is calculated between the first accumulated value corresponding to the first horizontal line and a second accumulated value corresponding to a second horizontal line which is to be displayed preceding to the first horizontal line. A first compensation value with respect to a first subpixel of the first horizontal line is obtained according to a first input subpixel data of the input subpixel data, the difference value and a first voltage polarity for driving the first subpixel. A first output subpixel data to be displayed by the first subpixel on the first horizontal line is generated according to the first input subpixel data and the first compensation value.

An embodiment of the disclosure provides a data compensation method, which is suitable for a display control circuit. The data compensation method includes following steps. Input subpixel data corresponding to subpixels of a first horizontal line of a display panel are converted respectively into digital values. Each of the digital values is related to a driving voltage capable of driving a corresponding subpixel of the first horizontal line to display. Each of the input subpixel data is converted into one of the digital values according to a voltage polarity for driving the corresponding subpixel. A first accumulated value is generated by accumulating the digital values converted from the plurality of input subpixel data corresponding to the first horizontal line. An in-line compensation value with respect to a first subpixel of the first horizontal line is obtained according to a first input subpixel data of the input subpixel data, the first accumulated value, and a first voltage polarity for driving the first subpixel. A first output subpixel data to be displayed by the first subpixel of the first horizontal line is generated according to the first input subpixel data and the in-line compensation value.

Another embodiment of the disclosure provides a display control circuit, which includes a voltage converter, a line accumulator, a difference calculator, a compensation calculator and an arithmetic unit. The voltage converter is coupled with an image processing circuit. The voltage converter being configured to convert input subpixel data from the image processing circuit corresponding to subpixels of a first horizontal line of a display panel respectively into digital values. Each of the digital values is related to a driving voltage capable of driving a corresponding subpixel of the first horizontal line to display. Each of the plurality of input subpixel data is converted by the voltage converter into one of the digital values according to a voltage polarity for driving the corresponding subpixel. The line accumulator is configured to generate a first accumulated value by accumulating the digital values converted from the plurality of input subpixel data corresponding to the first horizontal line, and the line accumulator generate a second accumulated value corresponding to a second horizontal line which is to be displayed preceding to the first horizontal line. The difference calculator is configured to calculate a difference value between the first accumulated value and the second accumulated value. The compensation calculator is configured to obtain a first compensation value with respect to a first subpixel of the first horizontal line according to a first input subpixel data of the input subpixel data, the difference value and a first voltage polarity for driving the first subpixel. The arithmetic unit is configured to generate a first output subpixel data to be displayed by the first subpixel of the first horizontal line according to the first input subpixel data and the first compensation value.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIG. 5 is a schematic diagram illustrating an example of the second look-up table corresponding to the positive polarity.

FIG. 6 is a schematic diagram illustrating an example of the second look-up table corresponding to the negative polarity.

FIG. 9 is a schematic diagram illustrating an example of the third look-up table corresponding to the positive polarity.

FIG. 10 is a schematic diagram illustrating an example of the third look-up table corresponding to the negative polarity.

DETAILED DESCRIPTION

Figure 1:
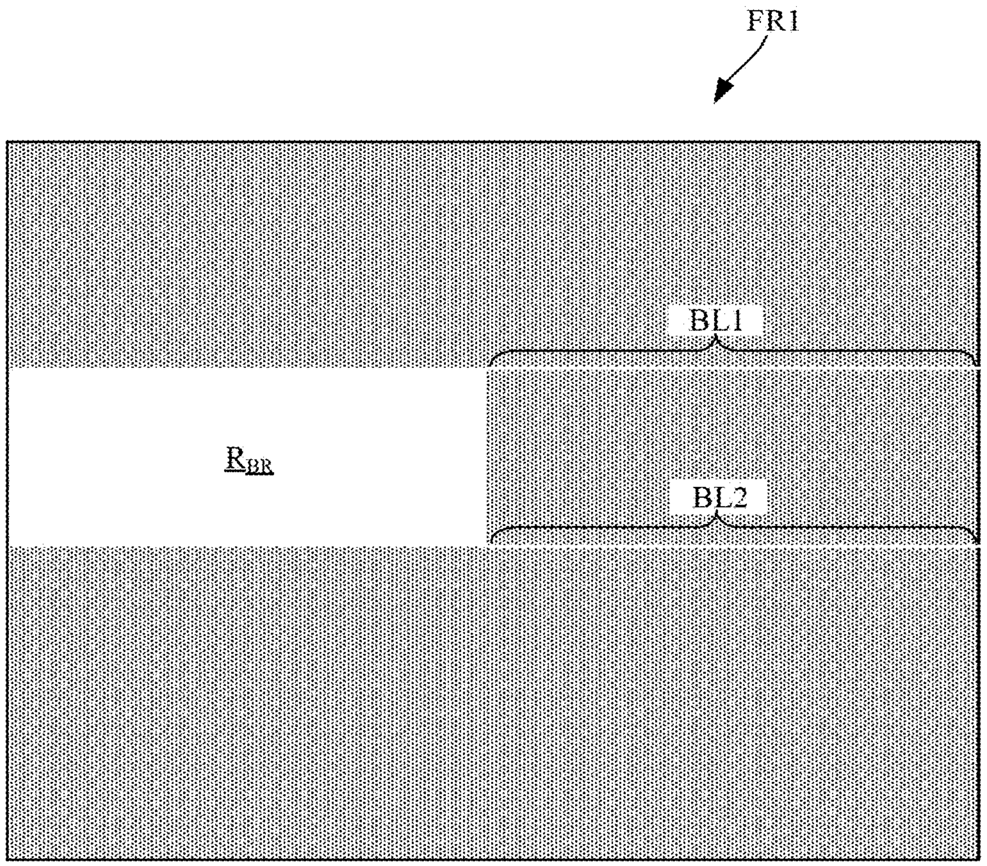
FIG. 1 (PRIOR ART)
FIG. 1 is a schematic diagram illustrating an example of a display frame with horizontal crosstalk appeared on an LCD panel according to the prior art.

Reference will now be made in detail to the present embodiments of the disclosure, examples of which are illustrated in the accompanying drawings. Wherever possible, the same reference numbers are used in the drawings and the description to refer to the same or like parts.

Figure 2:
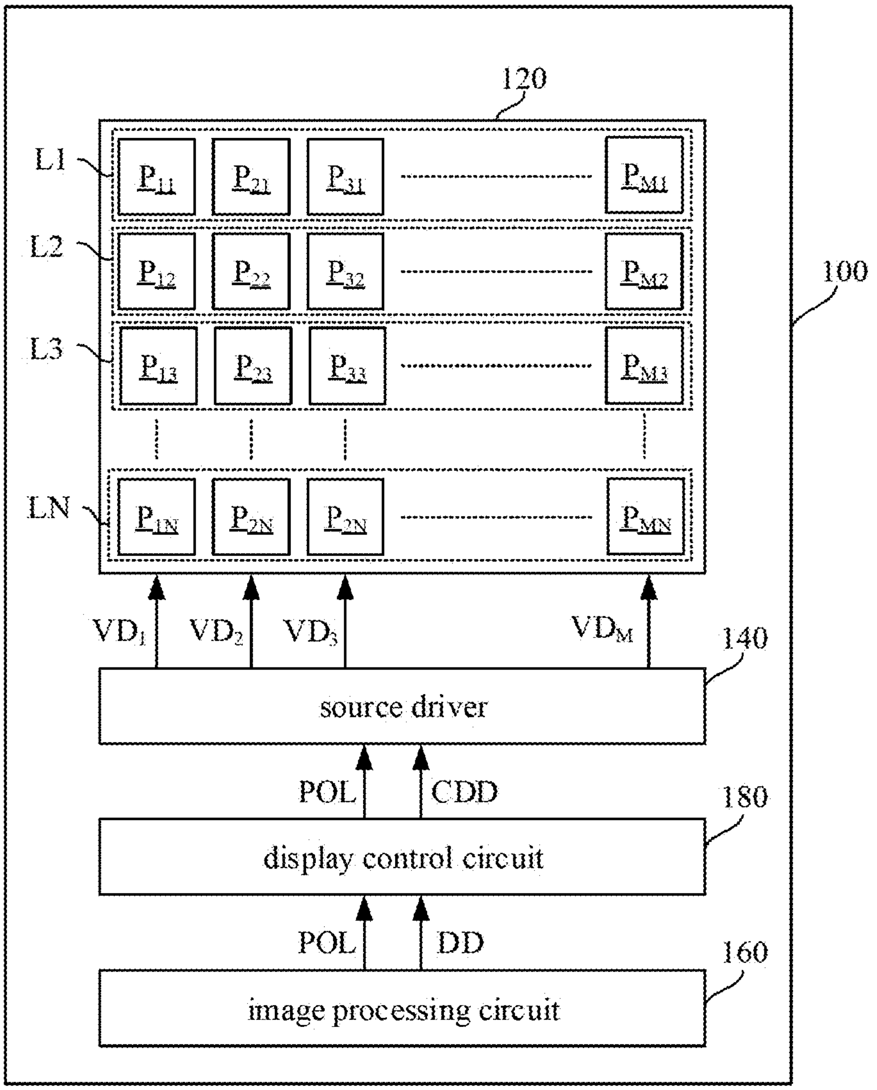
FIG. 2 is a schematic diagram illustrating a display device according to some embodiments of this disclosure.

Reference is made to FIG. 2, which is a schematic diagram illustrating a display device 100 according to some embodiments of this disclosure. As shown in FIG. 2, the display device 100 includes a display panel 120 (e.g., an LCD panel), a source driver 140, an image processing circuit 160 and a display control circuit 180.

As shown in FIG. 2, the display panel 120 includes several subpixels, such as subpixels $P_{11}$, $P_{21}$, $P_{31}$ . . . $P_{M1}$ of a first horizontal line L1; subpixels $P_{12}$, $P_{22}$, $P_{32}$ . . . $P_{M2}$ of a second horizontal line L2; subpixels $P_{13}$, $P_{23}$, $P_{33}$ . . . $P_{M3}$ of a third horizontal line L3; and subpixels $P_{1N}$, $P_{2N}$, $P_{3N}$ . . . $P_{MN}$ of a N-th horizontal line LN. M and N are positive integers according to a resolution of the display panel 120.

As shown in FIG. 2, the source driver 140 is coupled with the display panel 120. The source driver 140 is configured to provide data voltages $VD_1$ for driving the subpixels $P_{11}$~$P_{1N}$ on a first data line (not shown in FIG. 2), data voltages $VD_2$ for driving the subpixels $P_{21}$~$P_{2N}$ on a second data line (not shown in FIG. 2), data voltages $VD_3$ for driving the subpixels $P_{31}$~$P_{3N}$ on a third data line (not shown in FIG. 2), and data voltages $VD_M$ for driving the subpixels $P_{M1}$~$P_{MN}$ on a M-th data line (not shown in FIG. 2).

The image processing circuit 160 is configured to provide input frame data DD and a voltage polarity signal POL. The voltage polarity signal POL includes a plurality of polarity values utilized to individually set the voltage polarity of each of the subpixels $P_{11}$~$P_{MN}$ of the first horizontal line L1 to the N-th horizontal line LN, which may be a positive polarity or a negative polarity, so as to achieve a polarity inversion function on the display device 100. The polarity inversion function may be used for preventing liquid crystals from polarization and is beneficial to avoid a ghost image or a burn-in damage on the display panel 120. In some embodiments, the image processing circuit 160 can be a graphic processor (GPU), a digital signal processor (DSP), a micro processing unit (MCU), an application processor (AP) or other type of system-on-chip (SOC).

In some embodiments of the disclosure, the display control circuit 180 is configured to eliminate the horizontal crosstalk, such as the unwanted bright line segments BL1 and BL2 as shown in FIG. 1. In some embodiments of the disclosure, the display control circuit 180 may be implemented by a timing controller (TCON) or implemented in an integrated circuit including display timing control function.

As shown in FIG. 2, the display control circuit 180 is coupled between the image processing circuit 160 and the source driver 140. The display control circuit 180 receives the input frame data DD (relative to each of the subpixels $P_{11}$ to $P_{MN}$) and corresponding voltage polarity signal POL (relative to each of the subpixels $P_{11}$ to $P_{MN}$) from the image processing circuit 160. The display control circuit 180 is configured to convert the input frame data DD into output frame data CDD for compensating the aforementioned horizontal crosstalk issue.

Further details about how to convert the input frame data DD into output frame data CDD for horizontal crosstalk compensation by the display control circuit 180 will be discussed in following paragraphs. In some embodiments, the frame data DD can be input gray levels relative to the subpixels $P_{11}$ to $P_{MN}$, and the output frame data CDD can be output gray levels after compensation for driving each of the subpixels $P_{11}$ to $P_{MN}$.

Figure 3:
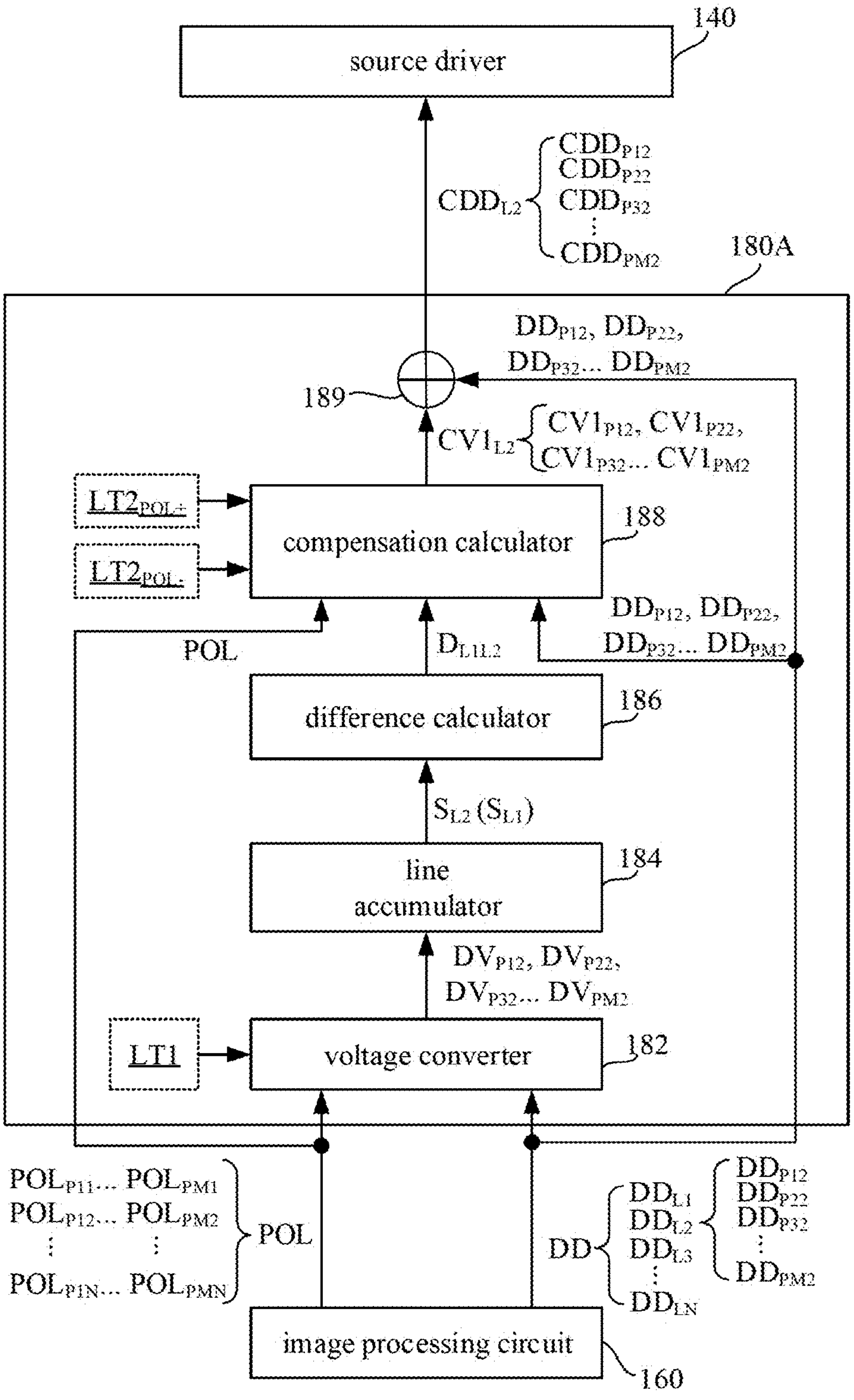
FIG. 3 is a schematic diagram illustrating a structure of the display control circuit according to some embodiments of the disclosure.
Figure 4:
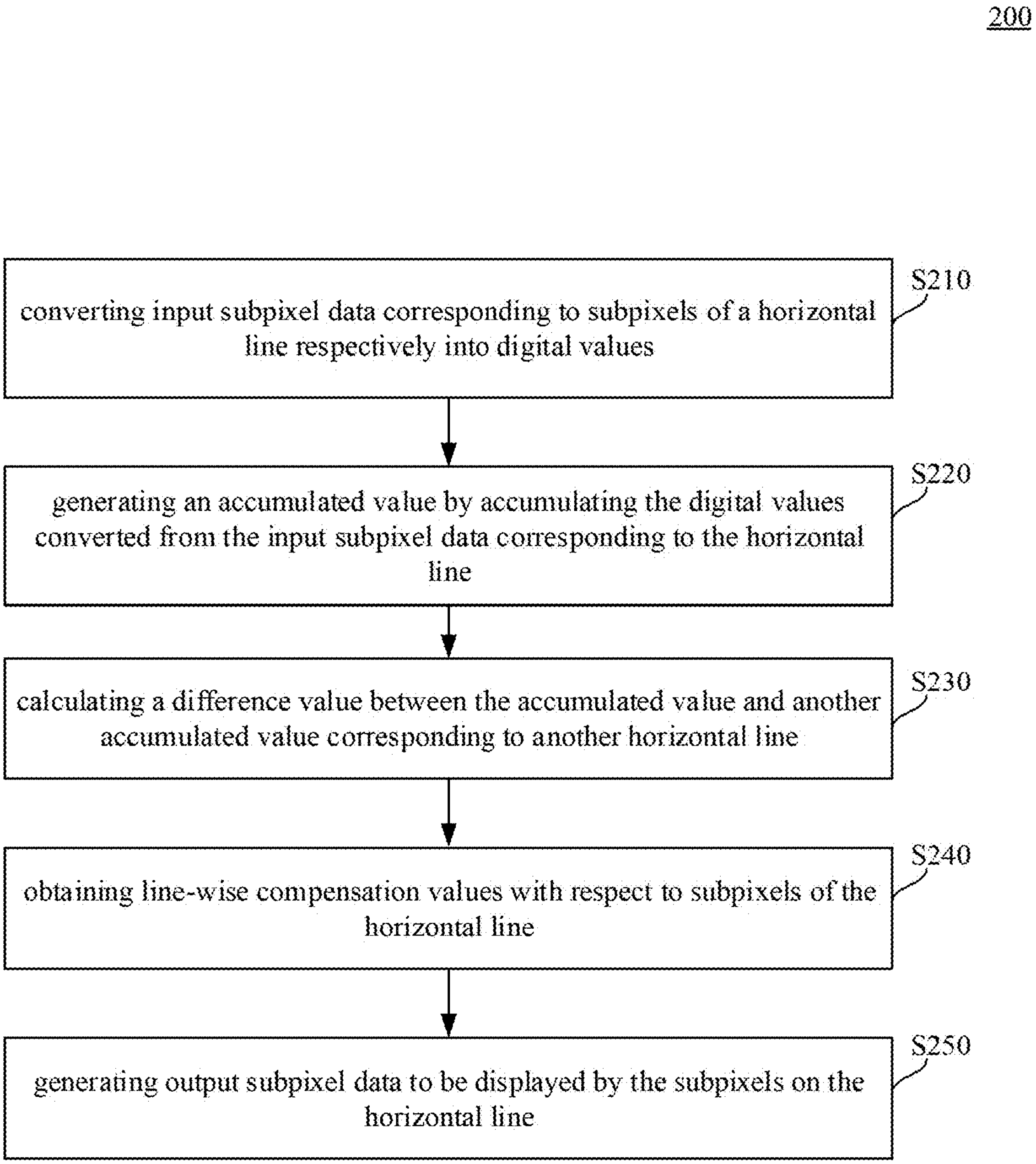
FIG. 4 illustrating a data compensation method executed by the display control circuit shown in FIG. 3.

Reference is further made to FIG. 3 and FIG. 4. FIG. 3 is a schematic diagram illustrating a structure of the display control circuit 180A according to some embodiments of the disclosure. FIG. 4 illustrating a data compensation method 200 executed by the display control circuit 180A shown in FIG. 3. The display control circuit 180A shown in FIG. 3 is one embodiment to implement the display control circuit 180 shown in FIG. 2.

As shown in FIG. 3, the display control circuit 180A includes a voltage converter 182, a line accumulator 184, a difference calculator 186, a compensation calculator 188 and an arithmetic unit 189. In some embodiments, the voltage converter 182, a line accumulator 184, a difference calculator 186, a compensation calculator 188 and an arithmetic unit 189 can be implemented by hardware circuits, software instructions executed by the display control circuit 180A or combinations of the aforementioned type of hardware circuit and software instructions.

In some embodiments, the display control circuit 180A is configured to receive input frame data DD and voltage polarity signal POL from the image processing circuit 160. The input frame data DD includes input line data $DD_{L1}$ (including a plurality of subpixel data corresponding to subpixels of a horizontal line L1), input line data $DD_{L2}$ (including a plurality of subpixel data corresponding to subpixels of another horizontal line L2), input line data $DD_{L3}$ (including a plurality of subpixel data corresponding to subpixels of another horizontal line L3) . . . and input line data $DD_{LN}$ (including a plurality of subpixel data corresponding to subpixels of another horizontal line LN).

To be more specific, for example, the input line data $DD_{L2}$ include an input subpixel data $DD_{P12}$ for the subpixel $P_{12}$ of the horizontal line L2, an input subpixel data $DD_{P22}$ for the subpixel $P_{22}$ of the horizontal line L2, an input subpixel data $DD_{P32}$ for the subpixel $P_{32}$ of the horizontal line L2 . . . and an input subpixel data $DD_{PM2}$ for the subpixel $P_{M2}$ of the horizontal line L2.

Similarly, the input line data $DD_{L1}$ includes M input subpixel data (not shown in FIG. 3) for M different subpixels $P_{11}$, $P_{21}$, $P_{31}$ . . . $P_{M1}$ of the horizontal line L1 shown in FIG. 2. The input line data $DD_{L3}$ includes M input subpixel data (not shown in FIG. 3) for M different subpixels $P_{13}$, $P_{23}$, $P_{33}$ . . . $P_{M3}$ of the horizontal line L3 shown in FIG. 2. The input line data $DD_{LN}$ includes M input subpixel data (not shown in FIG. 3) for M different subpixels $P_{1N}$, $P_{2N}$, $P_{3N}$ . . . $P_{MN}$ of the horizontal line LN shown in FIG. 2.

The horizontal line L2 is an adjacent line displaying next to the horizontal line L1 displaying. In other word, the horizontal line L1 displays preceding to the horizontal line L2 displays.

For brevity, following steps are demonstrated based on the input subpixel data $DD_{P12}$ for the subpixel $P_{12}$ of the horizontal line L2, the input subpixel data $DD_{P22}$ for the subpixel $P_{22}$ of the horizontal line L2, the input subpixel data $DD_{P32}$ for the subpixel $P_{32}$ of the horizontal line L2 . . . and the input subpixel data $DD_{PM2}$ for the subpixel $P_{M2}$ of the horizontal line L2. The following steps can also be executed relative to input subpixel data for subpixels of different horizontal lines, such as L1, L3 . . . LN.

In step S210, the voltage converter 182 is configured to converting input subpixel data $DD_{P12}$, $DD_{P22}$, $DD_{P32}$ . . . $DD_{PM2}$ corresponding to subpixels $P_{12}$, $P_{22}$, $P_{32}$ . . . $P_{M2}$ of the horizontal line L2 of the display panel 120 respectively into digital values $DV_{P12}$, $DV_{P22}$, $DV_{P32}$ . . . $DV_{PM2}$. Each of the digital values $DV_{P12}$, $DV_{P22}$, $DV_{P32}$ . . . $DV_{PM2}$ is related to a driving voltage (gamma voltage) capable of driving a corresponding subpixel to display the corresponding input subpixel data. Each of the input subpixel data $DD_{P12}$, $DD_{P22}$, $DD_{P32}$ . . . $DD_{PM2}$ is converted into a respective one of the digital values $DV_{P12}$, $DV_{P22}$, $DV_{P32}$ . . . $DV_{PM2}$ according to a corresponding one of the polarity values $POL_{P12}$, $POL_{P22}$, $POL_{P32}$ . . . $POL_{PM2}$ included in the voltage polarity signal POL for driving the corresponding subpixel $P_{12}$, $P_{22}$, $P_{32}$ . . . $P_{M2}$ with reference to a first look-up table LT1. Each of the polarity values is either a positive polarity (+) or a negative polarity (−) and indicated by the logic high/low level of the voltage polarity signal POL. Every gray level (from 0 to 255 if the data depth of input subpixel data is 8-bits) has a corresponding gamma voltage. The corresponding gamma voltage can be represented by a digital value which may have a data depth not less than the data depth of the input subpixel data.

In some embodiments, the first look-up table LT1 records a mapping relationship between input subpixel data and corresponding digital values under a positive polarity POL+ and a negative polarity POL− as shown in Table 1:

TABLE 1

| input subpixel data ($DD_{Pij}$) | POL− digital value ($DV_{Pij}$) | POL+ digital value ($DV_{Pij}$) |
|---|---|---|
| 0 | −11 | 11 |
| 1 | −11 | 11 |
| 2 | −12 | 12 |
| 3 | −13 | 13 |
| 4 | −13 | 13 |
| 5 | −13 | 13 |
| 6 | −14 | 14 |
| . . . | . . . | . . . |
| . . . | . . . | . . . |
| 254 | −108 | 108 |
| 255 | −127 | 127 |

In Table 1, the input subpixel data $DD_{Pij}$) indicates one input subpixel data corresponding to one subpixel $P_{ij}$, in which "i" can be an integer from 1 to M, and "j" can be an integer from 1 to N. In Table 1, the digital value $DV_{Pij}$ indicates one digital value corresponding to the subpixel $P_{ij}$ after mapping.

In this embodiment as shown in Table 1, after mapping, the digital values $DV_{P12}$, $DV_{P22}$, $DV_{P32}$ . . . $DV_{PM2}$ vary within a numeric range between −127 to 127. The digital values $DV_{P12}$, $DV_{P22}$, $DV_{P32}$ . . . $DV_{PM2}$ can be used to represent the gamma voltages for driving the subpixel $P_{12}$, $P_{22}$, $P_{32}$ . . . $P_{M2}$ in following computation.

In this case, during step S220, the line accumulator 184 is configured to generate an accumulated value $S_{L2}$ by accumulating the digital values $DV_{P12}$, $DV_{P22}$, $DV_{P32}$ . . . $DV_{PM2}$, which are corresponding to the horizontal line L2.

The accumulated value $S_{L2}$ indicates an overall voltage sum (in a digital format) with respect to the subpixels the horizontal line L2. Similar steps (discussed in S210 and S220) can be executed corresponding to the horizontal line L1 to generate another accumulated value $S_{L1}$ corresponding to the horizontal line L1. When a difference value between the accumulated value $S_{L2}$ and the accumulated value $S_{L1}$ is calculated, it may be known that whether most of data voltages output to the subpixels of the horizontal line L2 changes (compared to data voltages output to the subpixels of the horizontal line L1) in a large degree or not.

In some embodiments, due to computation resource may be limited, the line accumulator 184 truncates some lower bits of every accumulated value, including $S_{L1}$, $S_{L2}$, $S_{L3}$ . . . such that only higher bits of the accumulated value are retained. For example, the line accumulator 184 truncates some lower bits of the accumulated values $S_{L1}$ and $S_{L2}$ to keep the accumulated values $S_{L1}$ and $S_{L2}$ in 10-bits (signed). In this case, the kept accumulated values $S_{L1}$ and $S_{L2}$ are capable of varying between −512 to 512.

As shown in FIG. 3 and FIG. 4, in step S230, the difference calculator 186 is configured to calculate a difference value $D_{L1L2}$ between the accumulated value $S_{L1}$ and the accumulated value $S_{L2}$. For example, the difference value $D_{L1L2}$ can be equal to $S_{L2}-S_{L1}$. In some embodiments, the difference value $D_{L1L2}$ may be truncated before obtaining the compensation value $CV1_{L2}$. For example, some lower bits of the difference value $D_{L1L2}$ can be truncated and higher bits of the difference value $D_{L1L2}$ are retained.

As shown in FIG. 3 and FIG. 4, in step S240, the compensation calculator 188 is configured to obtain line-wise compensation values $CV\mathbf{1}_{L2}$ (including $CV\mathbf{1}_{P12}$, $CV\mathbf{1}_{P22}$, $CV\mathbf{1}_{P32}$ . . . $CV\mathbf{1}_{PM2}$) corresponding to the horizontal line L2 according to the difference value $D_{L1L2}$, the input line data $DD_{L2}$ (including input subpixel data $DD_{P12}$, $DD_{P22}$, $DD_{P32}$ . . . $DD_{PM2}$) and the polarity values (including $POL_{P12}$, $POL_{P22}$, $POL_{P32}$ . . . $POL_{PM2}$) of the subpixels of the horizontal line L2 with reference to one of second look-up table $LT\mathbf{2}_{POL+}$ and $LT\mathbf{2}_{POL-}$.

Reference is further made to FIG. 5 and FIG. 6. FIG. 5 is a schematic diagram illustrating an example of the second look-up table $LT\mathbf{2}_{POL+}$ corresponding to the positive polarity. That is, the second look-up table $LT\mathbf{2}_{POL+}$ is provided for the input subpixel data of subpixels driven by data voltages with the positive polarity. FIG. 6 is a schematic diagram illustrating an example of the second look-up table $LT\mathbf{2}_{POL-}$ corresponding to the negative polarity. That is, the second look-up table $LT\mathbf{2}_{POL-}$ is provided for the input subpixel data of subpixels driven by data voltages with the negative polarity. Due to the sizes of allocated memory resource, the second look-up tables may not include compensation values corresponding to every possible values of input subpixel data and every possible difference value. Instead, the second look-up tables may include a limited number of compensation values with respect to some input subpixel data taken as reference points (called reference input subpixel data) and some difference values taken as reference points (called reference difference values). Therefore, each of second look-up table $LT\mathbf{2}_{POL+}$ and $LT\mathbf{2}_{POL-}$ may record a plurality of reference compensation values determined based on a plurality of reference input subpixel data (i.e., gray levels, presented in a vertical axis) and a plurality of reference difference values (presented in a horizontal axis). When the received input subpixel data and the obtained difference value are not found in the reference input subpixel data and reference difference values, the compensation calculator 188 may performed interpolation based on some of the plurality of reference compensation values, which are selected based on two reference input subpixel data that the received input subpixel data is between and two reference difference values that obtained difference value is between, to obtain a line-wise compensation value.

A subpixel $P_{12}$ of the horizontal line L2 is discussed for example. When the polarity value $POL_{P12}$ of the subpixel $P_{12}$ indicates the positive polarity, the compensation calculator 188 refers to a second look-up table $LT\mathbf{2}_{POL+}$ to obtain the compensation value. When the polarity value $POL_{P12}$ of the subpixel $P_{12}$ indicates the negative polarity, the compensation calculator 188 refers to another second look-up table $LT\mathbf{2}_{POL-}$ to obtain the compensation value.

It is assumed that the input subpixel data $DD_{P12}$ is 120 (presented in a preconfigured data depth such as 8-bits), the polarity value $POL_{P12}$ of the subpixel $P_{12}$ indicates the positive polarity, and the difference calculator 186 calculates the difference value $D_{L1L2}$ and gets 32 as the answer. In this assumed case, 120 as the received input subpixel data $DD_{P12}$ is between two reference input subpixel data, 112 and 128, and 32 as the obtained difference value is between two reference difference values, 0 and 64, therefore four reference compensation values in a corresponding part SEL1 in the second look-up table $LT\mathbf{2}_{POL+}$ shown in FIG. 5 are selected, such that the compensation calculator 188 can perform linear interpolation to decide the line-wise compensation value $CV\mathbf{1}_{P12}$ for this input subpixel data $DD_{P12}$. By performing the linear interpolation based on the selected reference compensation values, the line-wise compensation value $CV\mathbf{1}_{P12}$ for this input subpixel data $DD_{P12}$ is obtained as −18. Similarly, other line-wise compensation values $CV\mathbf{1}_{P22}$, $CV\mathbf{1}_{P32}$ . . . $CV\mathbf{1}_{PM2}$ for other input subpixel data $DD_{P22}$, $DD_{P32}$ . . . $DD_{PM2}$ corresponding to the horizontal line L2 can be obtained in the same way.

As shown in FIG. 3 and FIG. 4, in step S250, the arithmetic unit 189 is configured to add the line-wise compensation values $CV\mathbf{1}_{L2}$ to the input line data $DD_{L2}$ for generating output line data $CDD_{L2}$ corresponding to the subpixels of the horizontal line L2. To be more specific, the arithmetic unit 189 is configured to add the line-wise compensation value $CV\mathbf{1}_{P12}$ to the input subpixel data $DD_{P12}$ for generating the output subpixel data $CDD_{P12}$ corresponding to the subpixel $P_{12}$ of the horizontal line L2. Similarly, the arithmetic unit 189 is configured to add the line-wise compensation value $CV\mathbf{1}_{P22}$ to the input subpixel data $DD_{P22}$ for generating the output subpixel data $CDD_{P22}$ corresponding to the subpixel $P_{22}$ of the horizontal line L2.

The output subpixel data $CDD_{P12}$ is transmitted to the source driver 140 (referring to FIG. 2) for generating a data voltage $VD_1$ to the subpixels $P_{12}$ of the horizontal line L2. In this case, the output subpixel data $CDD_{P12}$ in aforesaid assumption is equal to "120−18=102". The output subpixel data $CDD_{P22}$ is transmitted to the source driver 140 (referring to FIG. 2) for generating another data voltage $VD_2$ to the subpixels $P_{22}$ of the horizontal line L2. In this case, the output subpixel data $CDD_{P22}$ are generated based on the line-wise compensation value $CV\mathbf{1}_{P22}$ regarding to an accumulated voltage difference between the horizontal line L1 and the horizontal line L2.

In aforesaid embodiments shown in FIG. 3 and FIG. 4, the compensation of input subpixel data $DD_{P12}$, $DD_{P22}$, $DD_{P32}$ . . . $DD_{PM2}$ for subpixels $P_{12}$, $P_{22}$, $P_{32}$ . . . $P_{M2}$ of the horizontal line L2 are discussed for demonstrational purpose. However, the disclosure is not limited thereto. Steps S210 to S250 shown in FIG. 4 can be executed among other input line data $DD_{L1}$~$DD_{LN}$ (referring to FIG. 2) for generating output subpixel data of other horizontal lines L1~LN. For example, the steps S210 to S250 can be executed on input line data $DD_{L2}$ and $DD_{L3}$ for generating output subpixel data of the horizontal line L3.

In other words, the input subpixel data of a target horizontal line can be compensated based the line-wise difference value between accumulated data of this target horizontal line and accumulated data of another horizontal line adjacent to the target horizontal line. Based on the line-wise difference values, the display control circuit 180A is able to predict the degree of variation of data voltages when sequentially displaying line by line. The display control circuit 180A is configured to compensate the input subpixel data according to the line-wise difference values to eliminate or reduce the horizontal crosstalk issue.

Figure 7:
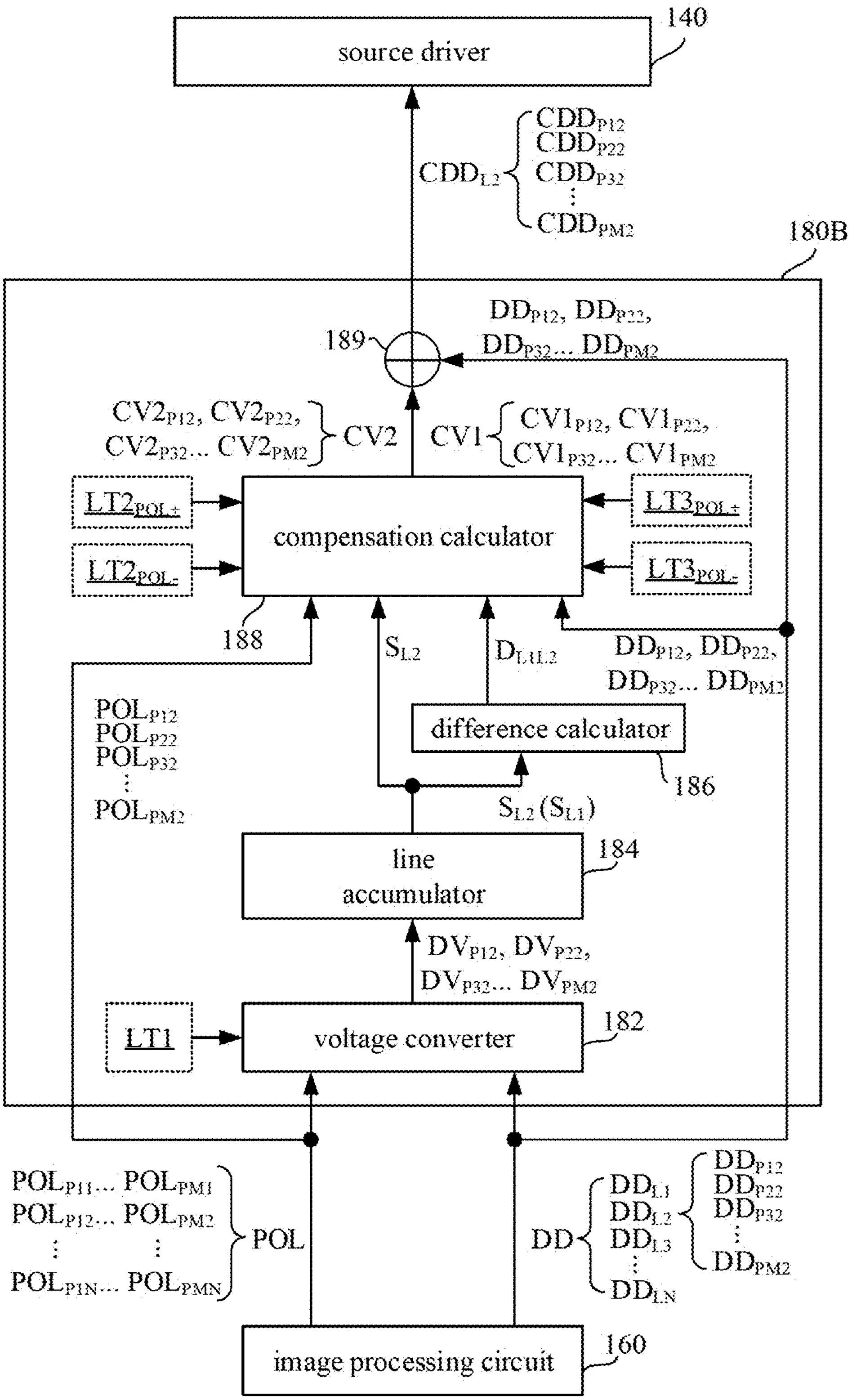
FIG. 7 is a schematic diagram illustrating a structure of the display control circuit according to some embodiments of the disclosure.
Figure 8:
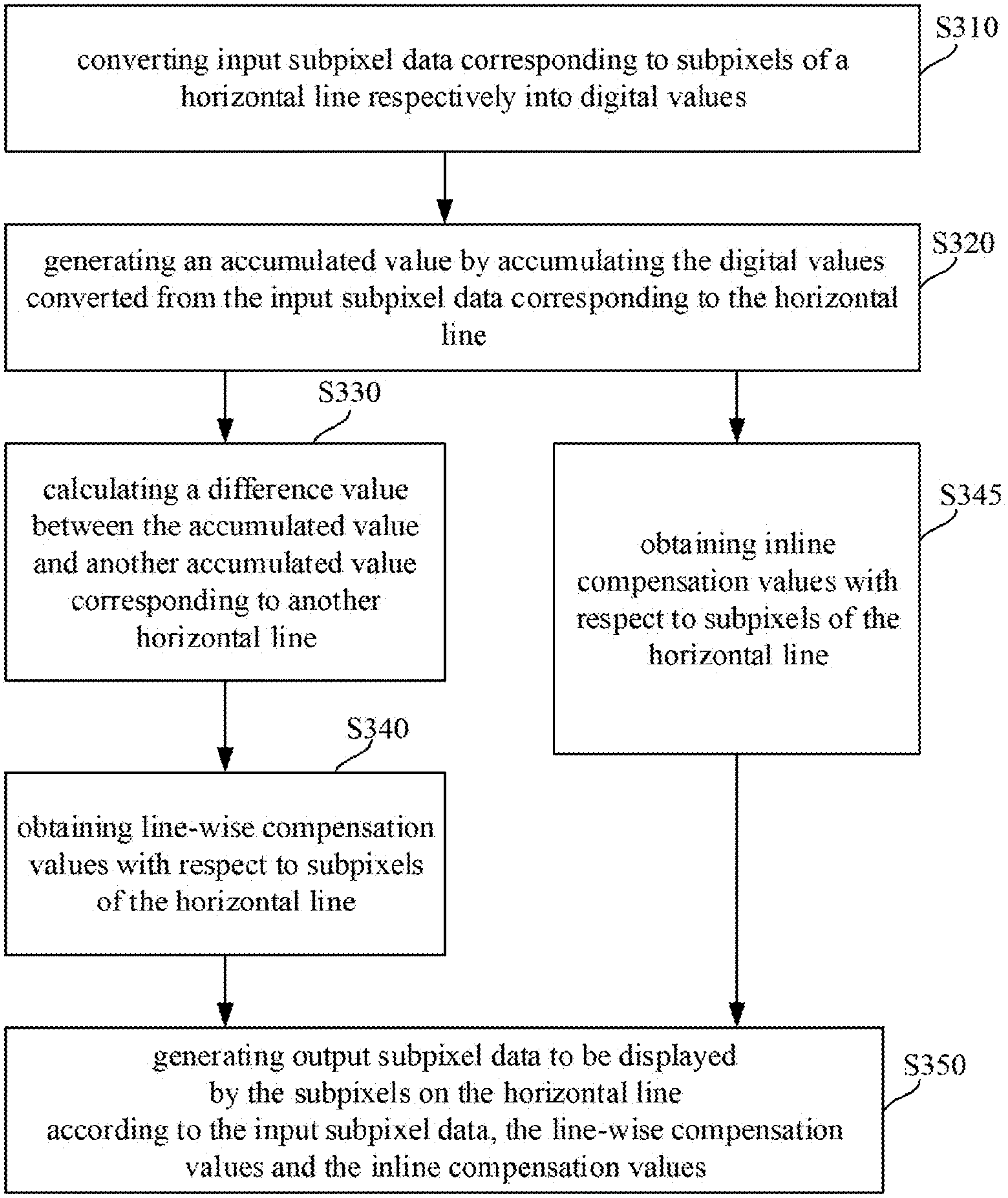
FIG. 8 illustrating a data compensation method executed by the display control circuit shown in FIG. 7.

The disclosure is not limited to compensate the output subpixel data only according to the difference values as discussed in aforesaid embodiments. Reference is further made to FIG. 7 and FIG. 8. FIG. 7 is a schematic diagram illustrating a structure of the display control circuit 180B according to some embodiments of the disclosure. FIG. 8 illustrating a data compensation method 300 executed by the display control circuit 180B shown in FIG. 7. The display control circuit 180B shown in FIG. 7 is another embodiment to implement the display control circuit 180 shown in FIG. 2.

As shown in FIG. 7, the display control circuit 180B includes a voltage converter 182, a line accumulator 184, a difference calculator 186, a compensation calculator 188 and an arithmetic unit 189, which can be implemented by hardware circuits, software instructions executed by the display control circuit 180B or combinations of the aforementioned type of hardware circuit and software instructions.

The display control circuit 180B shown in FIG. 7 may perform steps S310, S320, S330 and S340 in FIG. 8. These steps S310, S320, S330 and S340 executed by the display control circuit 180B are similar to the S210, S220, S230 and S240 previously discussed in FIG. 4, and not repeated again.

One difference, between the data compensation method 300 in FIG. 8 and the data compensation method 200 in FIG. 4, is that the data compensation method 300 further executes a step S345. In step S345, the compensation calculator 188 obtain in-line compensation values corresponding to the horizontal line L2 according to the accumulated value $S_{L2}$, the input line data $DD_{L2}$ (including input subpixel data $DD_{P12}$, $DD_{P22}$, $DD_{P32}$ . . . $DD_{PM2}$ for subpixels $P_{12}$, $P_{22}$, $P_{32}$ . . . $P_{M2}$ of the horizontal line L2) and the polarity values $POL_{P12}$, $POL_{P22}$, $POL_{P32}$ . . . $POL_{PM2}$ for subpixels $P_{12}$, $P_{22}$, $P_{32}$ . . . $P_{M2}$ of the horizontal line L2 with reference to one of third look-up tables $LT\mathbf{3}_{POL+}$ and $LT\mathbf{3}_{POL-}$.

When the polarity values $POL_{P12}$, $POL_{P22}$, $POL_{P32}$ . . . $POL_{PM2}$ corresponding to the input subpixel data $DD_{P12}$, $DD_{P22}$, $DD_{P32}$ . . . $DD_{PM2}$ is the positive polarity, the compensation calculator 188 refers to a third look-up table $LT\mathbf{3}_{POL+}$. When the polarity values $POL_{P12}$, $POL_{P22}$, $POL_{P32}$ . . . $POL_{PM2}$ corresponding to the input subpixel data $DD_{P12}$, $DD_{P22}$, $DD_{P32}$ . . . $DD_{PM2}$ is the negative polarity, the compensation calculator 188 refers to another third look-up table $LT\mathbf{3}_{POL-}$.

Reference is further made to FIG. 9 and FIG. 10. FIG. 9 is a schematic diagram illustrating an example of the third look-up table $LT\mathbf{3}_{POL+}$ corresponding to the positive polarity. FIG. 10 is a schematic diagram illustrating an example of the third look-up table $LT\mathbf{3}_{POL-}$ corresponding to the negative polarity. That is, the third look-up tables $LT\mathbf{3}_{POL+}$ is provided for the input subpixel data of subpixels driven by data voltages with the positive polarity, and the third look-up tables $LT\mathbf{3}_{POL-}$ is provided for the input subpixel data of subpixels driven by data voltages with the negative polarity. Also, due to the size of allocated memory resource, each of third look-up table $LT\mathbf{3}_{POL+}$ and $LT\mathbf{3}_{POL-}$ may record a plurality of reference compensation values determined based on a plurality of reference input subpixel data (i.e., gray levels, presented in a vertical axis) and a plurality of reference accumulated values (presented in a horizontal axis).

The subpixel $P_{12}$ of the horizontal line L2 is discussed for example. It is assumed that the input subpixel data $DD_{P12}$ is 120 and the polarity value $POL_{P12}$ of the subpixel $P_{12}$ indicates the positive polarity, and the line accumulator 184 calculates the accumulated value $S_{L2}$ and gets 96 as the answer. In this assumed case, 120 as the received input subpixel data $DD_{P12}$ is between two reference input subpixel data, 112 and 128, and 96 as the obtained accumulated value is between two reference accumulated values, 64 and 128, therefore four reference compensation values in a corresponding part SEL2 in the third look-up table $LT\mathbf{3}_{POL+}$ shown in FIG. 9 are selected, such that the compensation calculator 188 can perform linear interpolation to decide an inline compensation value $CV\mathbf{2}_{P12}$ for this input subpixel data $DD_{P12}$. By performing the linear interpolation based on the selected reference compensation values, the inline compensation value $CV\mathbf{2}_{P12}$ for this input subpixel data $DD_{P12}$ is obtained as −12. Similarly, other inline compensation values $CV\mathbf{2}_{P22}$, $CV\mathbf{2}_{P32}$ . . . $CV\mathbf{2}_{PM2}$ for other input subpixel data $DD_{P22}$, $DD_{P32}$ . . . $DD_{PM2}$ corresponding to the horizontal line L2 can be obtained in the same way.

In this embodiment shown in FIG. 7 and FIG. 8, in step S350, the data compensation method 300 generates output subpixel data $CDD_{P12}$ to be displayed by the subpixel $P_{12}$ of the horizontal line L2 according to the input subpixel data $DD_{P12}$, the line-wise compensation value $CV1_{P12}$ and also the inline compensation value $CV2_{P12}$.

For example, the arithmetic unit 189 adds the in-line compensation values $CV\mathbf{2}_{P12}$ together with the line-wise compensation values $CV\mathbf{1}_{P12}$ (referring to aforesaid embodiments about step S240 in FIG. 4) to the input subpixel data $DD_{P12}$ for generating the output subpixel data $CDD_{P12}$ corresponding to the subpixel $P_{12}$ of the horizontal line L2. In other words, the output subpixel data $CDD_{P12}$ are equal to "$DD_{P12}$+$CV\mathbf{1}_{P12}$+$CV\mathbf{2}_{P12}$". In this case, one of the output subpixel data $CDD_{P12}$ in aforesaid assumption is equal to "120−18−12=90". Similarly, other output subpixel data $CDD_{P22}$, $CDD_{P32}$ . . . $CDD_{PM2}$ for other subpixels $P_{22}$, $P_{32}$ . . . $P_{M2}$ of the horizontal line L2 can be obtained in the same way.

In other words, the input subpixel data of a target horizontal line can be compensated based the line-wise difference value between subpixel data of this target horizontal line and subpixel data of another horizontal line adjacent to the target horizontal line and also based on an in-line compensation value. Based on the line-wise difference values, the display control circuit 180B is able to predict the degree of variation of data voltages when sequentially displaying line by line. Based on the in-line accumulated values, the display control circuit 180B is able to predict an overall data voltage level of the target horizontal line. The display control circuit 180B is configured to compensate the input subpixel data according to both of the line-wise difference values and in-line accumulated values, so as to eliminate or reduce the horizontal crosstalk issue.

Figure 11:
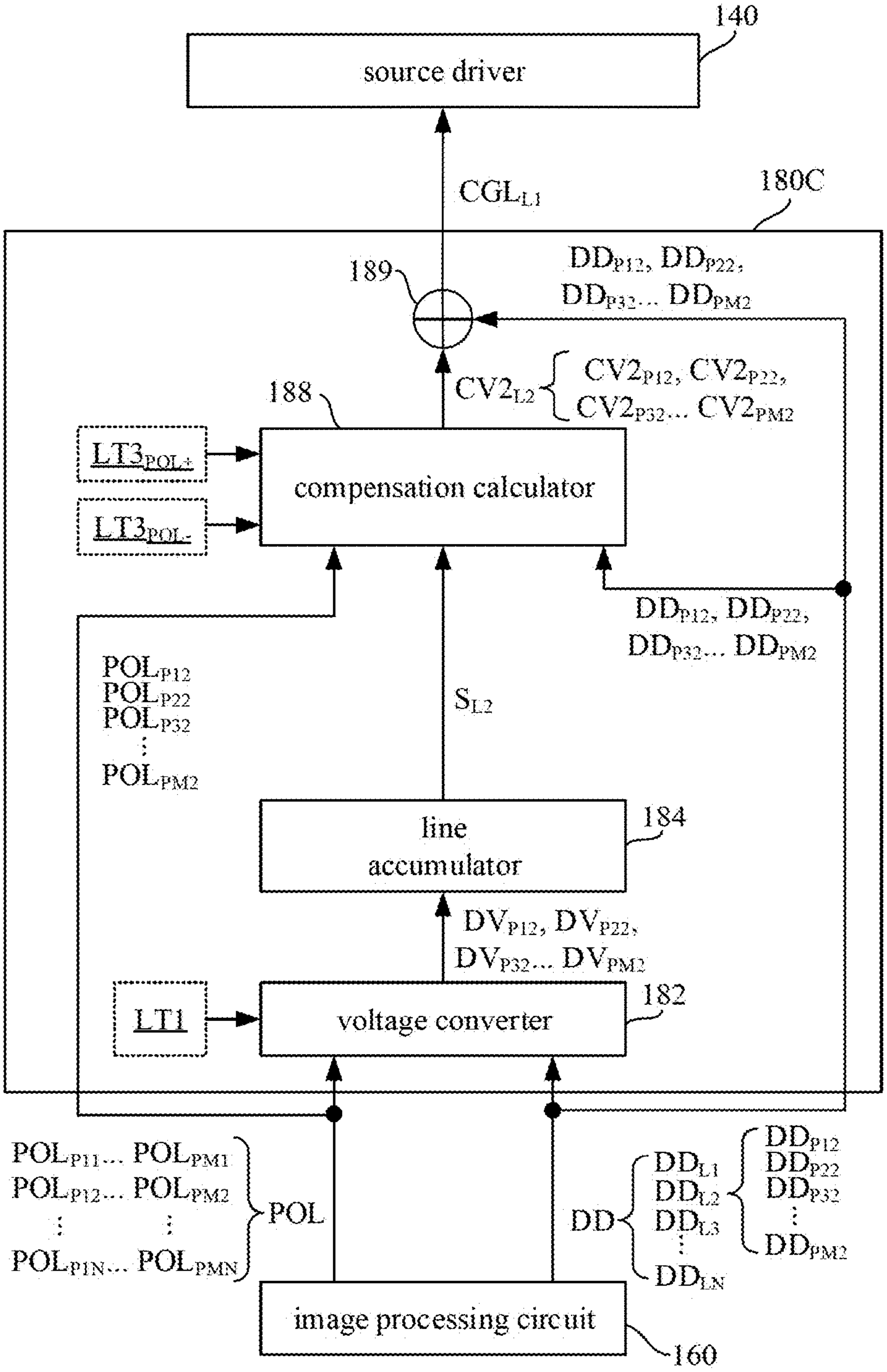
FIG. 11 is a schematic diagram illustrating a structure of the display control circuit to according to some embodiments of the disclosure.
Figure 12:
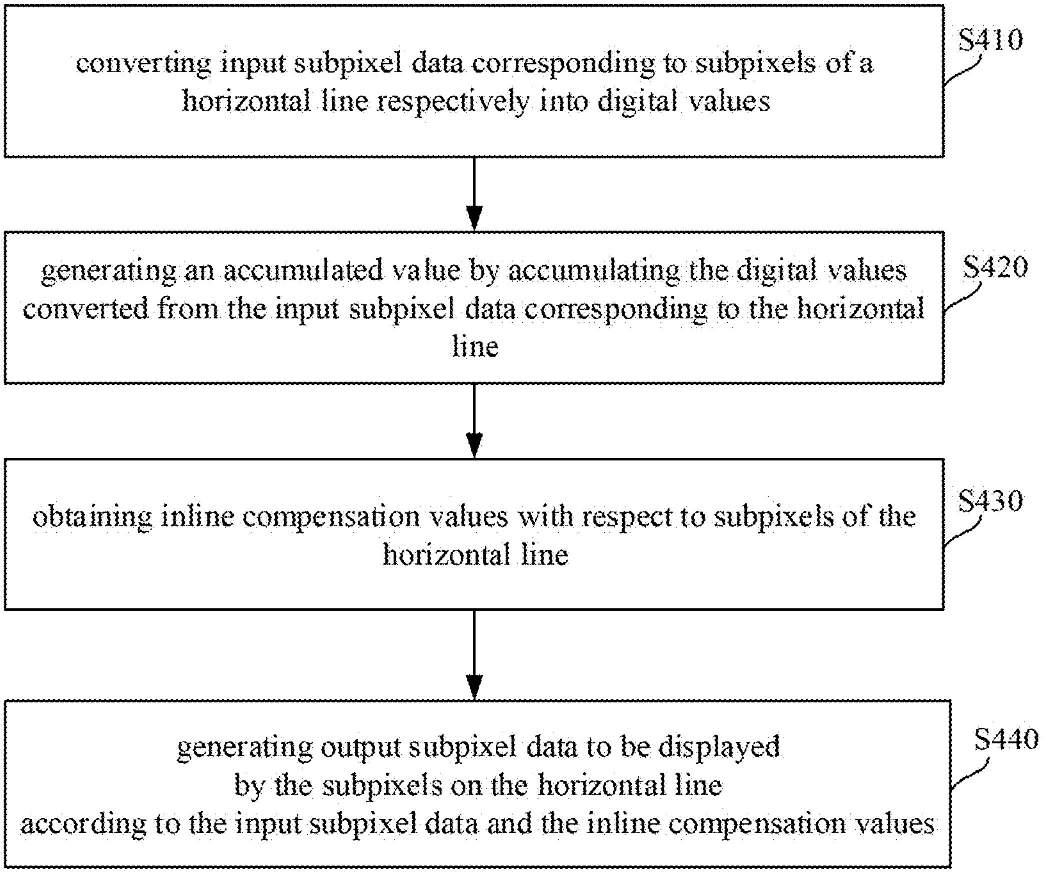
FIG. 12 illustrating a data compensation method 400 executed by the display control circuit shown in FIG. 11.

Reference is further made to FIG. 11 and FIG. 12. FIG. 11 is a schematic diagram illustrating a structure of the display control circuit 180C to according to some embodiments of the disclosure. FIG. 12 illustrating a data compensation method 400 executed by the display control circuit 180C shown in FIG. 11. The display control circuit 180C shown in FIG. 11 is another embodiment to implement the display control circuit 180 shown in FIG. 2.

The display control circuit 180C receives input frame data DD and voltage polarity signal POL.

The input frame data DD includes input line data $DD_{L1}$ (corresponding to subpixels of the horizontal line L1), input line data $DD_{L2}$ (corresponding to subpixels of the horizontal line L2), input line data $DD_{L3}$ (corresponding to subpixels of the horizontal line L3) . . . and input line data $DD_{LN}$ (corresponding to subpixels of the horizontal line LN).

To be more specific, the input line data $DD_{L2}$ include one input subpixel data $DD_{P12}$ for the subpixel $P_{12}$ of the horizontal line L2, another input subpixel data $DD_{P22}$ for the subpixel $P_{22}$ of the horizontal line L2, another input subpixel data $DD_{P32}$ for the subpixel $P_{32}$ of the horizontal line L2 . . . and another input subpixel data $DD_{PM2}$ for the subpixel $P_{M2}$ of the horizontal line L2.

The voltage polarity signal POL includes polarity values corresponding to subpixels of the horizontal line L1, polarity values corresponding to subpixels of the horizontal line L2, polarity values corresponding to subpixels of the horizontal line L3 . . . and polarity values corresponding to subpixels of the horizontal line LN.

To be more specific, a polarity value $POL_{P12}$ indicates the voltage polarity of the subpixel $P_{12}$ of the horizontal line L2, a polarity value $POL_{P22}$ indicates the voltage polarity of the subpixel $P_{22}$ of the horizontal line L2, a polarity value $POL_{P32}$ indicates the voltage polarity of the subpixel $P_{32}$ of the horizontal line L2 . . . and a polarity value $POL_{PM2}$ indicates the voltage polarity of the subpixel $P_{M2}$ of the horizontal line L2.

Operations to the subpixels $P_{12}$, $P_{22}$, $P_{32}$ . . . $P_{M2}$ of the horizontal line L2 are discussed for demonstrational purpose.

In step S410, the voltage converter 182 is configured to converting input subpixel data $DD_{P12}$, $DD_{P22}$, $DD_{P32}$ . . . $DD_{PM2}$ corresponding to subpixels $P_{12}$, $P_{22}$, $P_{32}$ . . . $P_{M2}$ of the horizontal line L2 of the display panel 120 respectively into digital values $DV_{P12}$, $DV_{P22}$, $DV_{P32}$ . . . $DV_{PM2}$ which are corresponding to gamma voltages. Details of step S410 are similar to step S210 discussed in aforementioned embodiments.

In step S420, the line accumulator 184 is configured to generate an accumulated value $S_{L2}$ by accumulating the digital values $DV_{P12}$, $DV_{P22}$, $DV_{P32}$ . . . $DV_{PM2}$ of the horizontal line L2. Details of step S420 are similar to step S220 discussed in aforementioned embodiments.

In step S430, the compensation calculator 188 obtain in-line compensation values corresponding to the horizontal line L2 according to the accumulated value $S_{L2}$, the input line data $DD_{L2}$ (including input subpixel data $DD_{P12}$, $DD_{P22}$, $DD_{P32}$ . . . $DD_{PM2}$ for subpixels $P_{12}$, $P_{22}$, $P_{32}$ . . . $P_{M2}$ of the horizontal line L2) and the polarity values $POL_{P12}$, $POL_{P22}$, $POL_{P32}$ . . . $POL_{PM2}$ for subpixels $P_{12}$, $P_{22}$, $P_{32}$ . . . $P_{M2}$ Of the horizontal line L2 with reference to one of third look-up tables $LT3_{POL+}$ and $LT3_{POL-}$. Details of step S430 are similar to step S345 discussed in aforementioned embodiments.

In step S440, the data compensation method 400 generates output subpixel data $CDD_{P12}$ to be displayed by the subpixel $P_{12}$ of the horizontal line L2 according to the input subpixel data $DD_{P12}$ and the inline compensation value $CV2_{P12}$. For example, the arithmetic unit 189 adds the in-line compensation values $CV2_{P12}$ to the input subpixel data $DD_{P12}$ for generating the output subpixel data $CDD_{P12}$ corresponding to the subpixel $P_{12}$ of the horizontal line L2. The output subpixel data $CDD_{P12}$ is transmitted to the source driver 140 for generating data voltages VDU to the subpixels $P_{12}$ of the horizontal line L2.

In other words, the input subpixel data of a target horizontal line can be compensated based an in-line compensation value. Based on the in-line accumulated values, the display control circuit 180C is able to predict an overall data voltage level of the horizontal data line. The display control circuit 180C is configured to compensate the input subpixel data according to the in-line accumulated values, so as to eliminate or reduce the horizontal crosstalk issue.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A data compensation method, suitable for a display control circuit, the data compensation method comprising:

converting a plurality of input subpixel data corresponding to subpixels of a first horizontal line of a display panel respectively into digital values, wherein each of the digital values is related to a driving voltage capable of driving a corresponding subpixel of the first horizontal line to display, each of the plurality of input subpixel data is converted into one of the digital values according to a voltage polarity for driving the corresponding subpixel;

generating a first accumulated value by accumulating the digital values converted from the plurality of input subpixel data corresponding to the first horizontal line;

calculating a difference value between the first accumulated value corresponding to the first horizontal line and a second accumulated value corresponding to a second horizontal line which is to be displayed preceding to the first horizontal line;

obtaining a first compensation value with respect to a first subpixel of the first horizontal line according to a first input subpixel data of the input subpixel data, the difference value and a first voltage polarity for driving the first subpixel; and generating a first output subpixel data to be displayed by the first subpixel of the first horizontal line according to the first input subpixel data and the first compensation value.

2. The data compensation method of claim 1, further comprising:

truncating the first accumulated value and the second accumulated value before the first accumulated value and the second accumulated value being used for calculating the difference value.

3. The data compensation method of claim 1, further comprising:

truncating the difference value between the first accumulated value and the second accumulated value before obtaining the first compensation value.

4. The data compensation method of claim 1, further comprising:

obtaining a second compensation value with respect to the first subpixel of the first horizontal line according to the first input subpixel data, the first accumulated value and the first voltage polarity.

5. The data compensation method of claim 4, wherein the step of generating the first output subpixel data to be displayed by the first subpixel of the first horizontal line further comprises:

generating the first output subpixel data to be displayed by the first subpixel of the first horizontal line according to the first input subpixel data, the first compensation value and the second compensation value.

6. A data compensation method, suitable for a display control circuit, the data compensation method comprising:

converting a plurality of input subpixel data corresponding to subpixels of a first horizontal line of a display panel respectively into digital values, wherein each of the digital values is related to a driving voltage capable of driving a corresponding subpixel of the first horizontal line to display, each of the plurality of input subpixel data is converted into one of the digital values according to a voltage polarity for driving the corresponding subpixel;

generating a first accumulated value by accumulating the digital values converted from the plurality of input subpixel data corresponding to the first horizontal line;

obtaining an in-line compensation value with respect to a first subpixel of the first horizontal line according to a first input subpixel data of the input subpixel data, the first accumulated value, and a first voltage polarity for driving the first subpixel; and generating a first output subpixel data to be displayed by the first subpixel of the first horizontal line according to the first input subpixel data and the in-line compensation value.

7. The data compensation method of claim 6, further comprising:

truncating the first accumulated value before the first accumulated value being used for obtaining the in-line compensation value.

8. A display control circuit, comprising:

a voltage converter, coupled with an image processing circuit, the voltage converter being configured to convert a plurality of input subpixel data from the image processing circuit corresponding to subpixels of a first horizontal line of a display panel respectively into digital values, wherein each of the digital values is related to a driving voltage capable of driving a corresponding subpixel of the first horizontal line to display, each of the plurality of input subpixel data is converted by the voltage converter into one of the digital values according to a voltage polarity for driving the corresponding subpixel;

a line accumulator, configured to generate a first accumulated value by accumulating the digital values converted from the plurality of input subpixel data corresponding to the first horizontal line, and generate a second accumulated value corresponding to a second horizontal line which is to be displayed preceding to the first horizontal line;

a difference calculator, configured to calculate a difference value between the first accumulated value and the second accumulated value;

a compensation calculator, configured to obtain a first compensation value with respect to a first subpixel of the first horizontal line according to a first input subpixel data of the input subpixel data, the difference value and a first voltage polarity for driving the first subpixel; and an arithmetic unit, configured to generate a first output subpixel data to be displayed by the first subpixel of the first horizontal line according to the first input subpixel data and the first compensation value.

9. The display control circuit of claim 8, wherein the line accumulator is further configured to truncate the first accumulated value and the second accumulated value before the difference calculator using the first accumulated value and the second accumulated value for calculating the difference value.

10. The display control circuit of claim 8, wherein the difference calculator is further configured to truncate the difference value between the first accumulated value and the second accumulated value before the compensation calculator obtaining the first compensation value.

11. The display control circuit of claim 8, wherein the compensation calculator is further configured to obtain a second compensation value with respect to the first subpixel of the first horizontal line according to the first input subpixel data, the first accumulated value and the first voltage polarity.

12. The display control circuit of claim 11, wherein the compensation calculator is further configured to generate the first output subpixel data to be displayed by the first subpixel of the first horizontal line according to the first input subpixel data, the first compensation value and the second compensation value.

13. The display control circuit of claim 8, wherein the display control circuit comprises a timing controller (TCON) in a display device.

* * * * *